(12) United States Patent
DeRose et al.

(10) Patent No.: US 7,855,030 B2
(45) Date of Patent: Dec. 21, 2010

(54) INHIBITOR FOR PREVENTION OF BRAZE MIGRATION IN SOLID OXIDE FUEL CELLS

(75) Inventors: Anthony J. DeRose, Rochester, NY (US); Stefan M. Maczynski, Canandaigua, NY (US); Carolyn D. Fleming, Lima, NY (US); Subhasish Mukerjee, Pittsford, NY (US); Rick D. Kerr, Fenton, MI (US); Karl J. Haltiner, Jr., Fairport, NY (US); Joseph Keller, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/433,920

(22) Filed: May 1, 2009

(65) Prior Publication Data

US 2010/0143760 A1 Jun. 10, 2010

(51) Int. Cl.
*H01M 8/10* (2006.01)
(52) U.S. Cl. .................. 429/479; 429/482; 429/507; 429/508; 429/509
(58) Field of Classification Search ............... 429/30
See application file for complete search history.

(56) References Cited

U.S. PATENT DOCUMENTS

| | | | |
|---|---|---|---|
| 6,811,914 B2* | 11/2004 | Meixner | 429/467 |
| 2002/0177025 A1* | 11/2002 | Kushibiki et al. | 429/30 |
| 2005/0202159 A1* | 9/2005 | Svoboda et al. | 427/115 |
| 2006/0060633 A1* | 3/2006 | Weil et al. | 228/101 |
| 2006/0216567 A1* | 9/2006 | England et al. | 429/34 |
| 2008/0217382 A1 | 9/2008 | Yong et al. | |

FOREIGN PATENT DOCUMENTS

| | | |
|---|---|---|
| DE | 198 41 919 | 3/2000 |
| EP | 1 616 657 | 1/2006 |
| EP | 1 775 790 | 4/2007 |
| FR | 2 109 015 | 5/1972 |
| WO | 2006/047770 | 5/2006 |

OTHER PUBLICATIONS

Kim Vu, "Silver Migration—The Mechanism and Effects on Thick-Film Conductors," Material Science Engineering 234, Spring 2003, College of Engineering, San Jose University.
European Search Report dated Aug. 23, 2010.
Zhenguo Yang et al: "Chemical Compatibility of Barium-Calcium-Aluminosilicate-Based Sealing Glasses with the Ferritic Stainless Steel Interconnect in SOFCs"; Journal of the Electrochemical Society, vol. 150, No. 8, Jun. 23, 2003, pp. A1095-A1101, XP002597307.

* cited by examiner

*Primary Examiner*—Dah-Wei D Yuan
*Assistant Examiner*—Patricia Davis
(74) *Attorney, Agent, or Firm*—Thomas N. Twomey

(57) ABSTRACT

During manufacture of an SOFC assembly, an inhibitor is included to prevent migration of silver braze during subsequent use of the SOFC assembly. The inhibitor may take any of several forms, either individually or in combination. Inhibitors comprehended by the present invention include, but are not limited to: a) a mechanical barrier that can be printed or dispensed onto one or more SOFC stack elements around the braze areas to prevent mechanically-driven migration; b) an electrically insulating feature in the electrolyte or interlayer over the electrolyte layer in the seal margins to prevent electrical potential-driven migration; and 3) chemical modification of the braze itself as by addition of an alloying metal such as palladium.

11 Claims, 2 Drawing Sheets

INHIBITOR FOR PREVENTION OF BRAZE MIGRATION IN SOLID OXIDE FUEL CELLS

RELATIONSHIP TO GOVERNMENT CONTRACTS

The present invention was supported in part by a US Government Contract, No. DE-FC26-02NT41246. The United States Government may have rights in the present invention.

TECHNICAL FIELD

The present invention relates to solid oxide fuel cells; more particularly, to conductive brazes in solid oxide fuel cell assemblies; and most particularly, to method and apparatus for preventing migration of conductive braze materials beyond their intended locations in solid oxide fuel cell assemblies.

BACKGROUND OF THE INVENTION

Solid oxide fuel cell (SOFC) assemblies typically operate at temperatures in the range of 500° C. to 1000° C. Seals are required between the margins of adjacent planar elements of the fuel cell stack to ensure separation of air and fuel through passages formed in such elements. Such seals must be stable for long periods of operating time at elevated operating temperatures. Some of such seals must be electrically insulative and thus typically are formed of glass ceramics, whereas other seals may be conductive and thus typically use silver/copper (Ag/Cu) braze alloys.

A problem in prior art SOFC assemblies is that the silver (Ag) in the Ag/Cu braze alloys migrate from braze joints into chemically and electrically active regions of the assembly wherein conductive braze can cause electrical shorting of adjacent elements or internal leakage between fuel and air passages. It appears that softened or molten braze tends to migrate in response to electric potential differences and/or spatial surface tension differences within a fuel cell stack. Electrochemical migration has been observed in other applications such as in thick-film conductors, as reported by Kim Vu in a published technical paper, *"Silver Migration—The Mechanism and Effects on Thick-Film Conductors"*, College of Engineering, Chemical and Material Science Engineering Department, San Jose State University (2003).

What is needed in the art is a method and apparatus for preventing braze migration in SOFC assemblies during high temperature use thereof.

It is a principal object of the present invention to prevent failure of SOFC assemblies from braze migration.

SUMMARY OF THE INVENTION

Briefly described, during manufacture of an SOFC assembly an inhibitor is included to prevent migration of braze during subsequent use of the SOFC assembly. The inhibitor may take any of several forms, either individually or in combination. Inhibitors comprehended by the present invention include, but are not limited to: a) a mechanical barrier that can be printed or dispensed onto one or more SOFC stack elements around the braze areas to prevent mechanically-driven migration; b) an electrically insulating feature in the electrolyte or interlayer over the electrolyte layer in the seal margins to prevent electrical potential-driven migration; and 3) chemical modification of the braze itself as by addition of an alloying metal such as palladium.

Suitable mechanical barrier materials are zirconia or ceria, or a glass ceramic silicate such as, for example, a glass ceramic silicate in the barium aluminum silicate family such as, for example, G18.

The interlayer or electrolyte may be impregnated with an insulating dopant, for example, alumina, silica, magnesium aluminate, or a glass ceramic such as G18, to reduce electrical conductivity with the electrolyte layer and interlayer.

The inclusion of about 15% palladium (Pd) in the braze significantly reduces the mobility of an Ag/Cu braze at SOFC operating temperatures.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
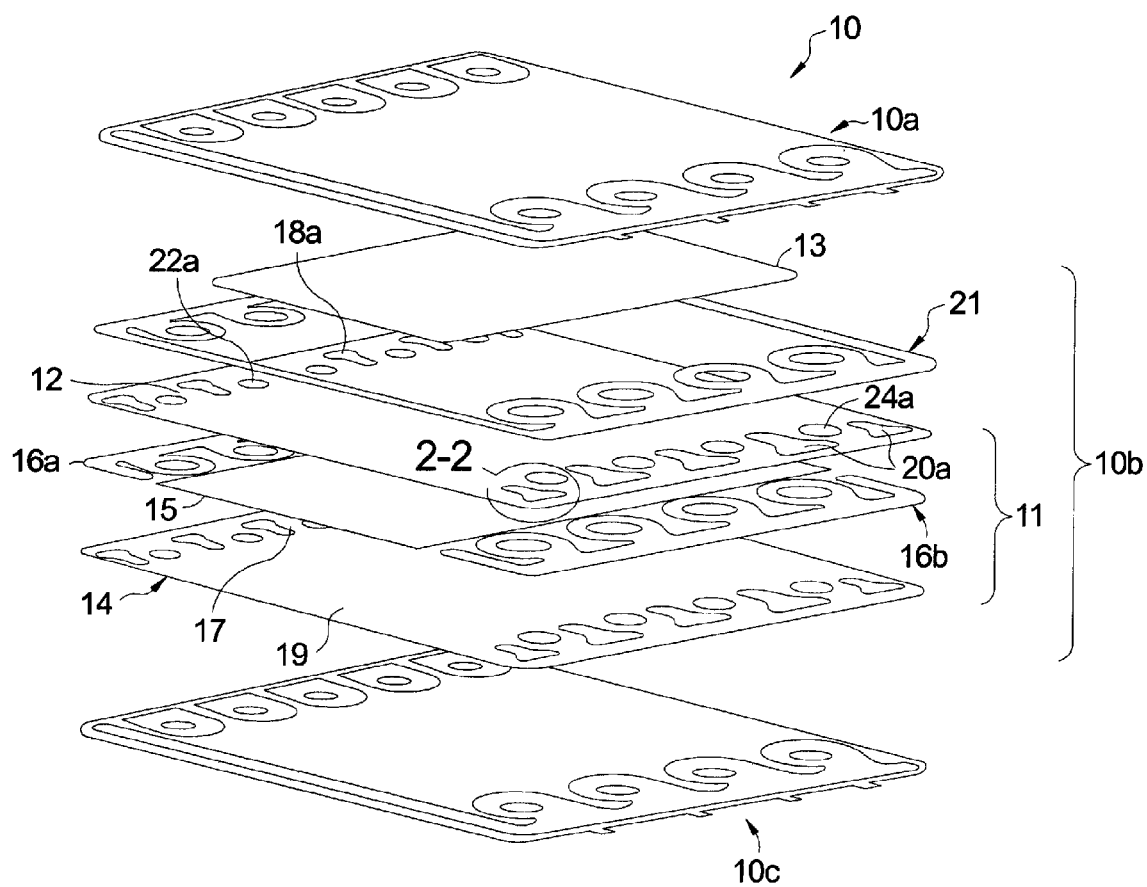
FIG. 1 is an exploded isometric view of a prior art 3-cell SOFC stack.

Referring to FIG. 1, a prior art 3-cell SOFC stack 10 comprises first and third cassettes 10a, 10c on either side of an intermediate second cassette 10b.

Second cassette 10b includes a cassette housing 11 including a fuel cell mounting plate 12 and a separation plate 14 for joining to the cassette housing of adjacent cassette 10c. Mounting plate 12 includes a large central electrode opening for receiving a cathode mesh air baffle 13. Outboard of the central electrode opening are cathode air inlets 18a, cathode air outlets 20a, fuel gas inlets 22a, and fuel gas outlets 24a. Separation plate 14 is provide with similar and mating air and fuel openings, respectively, said electrode and separation plate inlets and outlets defining respective supply and exhaust chimneys for air and fuel gas. Separation plate 14 is formed as a shallow tray such that a cavity is created between plates 12, 14 for receiving fuel cell components and fuel gas. A first anode modular spacer ring element 16a is installed adjacent anode fuel gas inlets 22a, and a second anode modular spacer ring element 16b is installed adjacent anode fuel gas outlets 24a. An anode mesh fuel baffle 15 is disposed between ring elements 16a, 16b. A silver alloy paste layer 17 electrically connects the cathode mesh 13 to the surface of the cathode layer in mounting plate 12. A nickel paste layer 19 electrically connects the anode mesh 15 to the separator plate 14. An insulating fusible glass seal 21 seals cassette 10b to cassette 10a. (A similar glass seal is required but not shown between cassette 10c and cassette 10b.)

Figure 2:
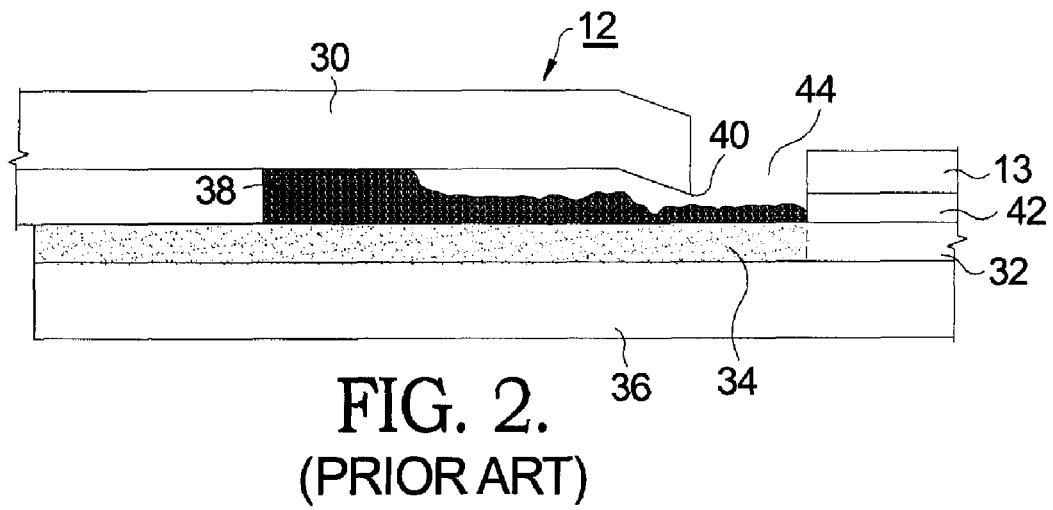
FIG. 2 is a cross-sectional view of a portion of a prior art SOFC cell taken at circle 2-2 in FIG. 1, showing braze migration.

Referring now to FIG. 2, in prior art second cassette 10b (and also identically in prior art cassettes 10a, 10c), fuel cell mounting plate 12 comprises a metal supporting frame 30, also known herein as a "picture frame", that surrounds the active area 32 of electrolyte layer 34 formed on supportive anode 36. Frame 30 also includes (FIG. 1) the cathode air inlets 18a and outlets 20a, and the fuel gas inlets 22a and outlets 24a not shown in FIG. 2). During assembly of fuel cell mounting plate 12, frame 30 is brazed to electrolyte layer 34, either directly as shown or via a thin optional interlayer (not shown), via a braze alloy 38 that is liquefied by sintering of the assembly. In the prior art, braze alloy 38 typically comprises silver (Ag) and copper (Cu) to provide a braze having suitable electrical conductivity and fusion temperature. With proper assembly procedure, during sintering braze alloy 38 terminates at enclosure lip 40 of frame 30. A cathode 42 is formed on electrolyte layer 34 over active area 32. During cell assembly, cathode mesh air baffle 13 is brought into intimate contact with the upper side of cathode 42. A gap or margin 44 is formed between cathode 42 and frame 30.

As shown schematically in FIG. 2 and described in detail hereinabove, it is a known problem in prior art SOFC stacks that, during fuel cell operation, braze 38 may gradually soften and tend to migrate along the surface of electrolyte 34 (or the not-shown interlayer beyond lip 40) across margin 44 until the braze makes contact with cathode 42. Such migration is highly undesirable and can result in failure of an SOFC cell 10a, 10b, 10c, and thus failure of the entire stack 10, especially if the migration is sufficient to permit communication of fuel gas from a fuel gas opening 22a,22b into the cathode air space above cathode 42 within mesh 13. The present invention is directed to means for inhibiting such migration.

Figure 3:
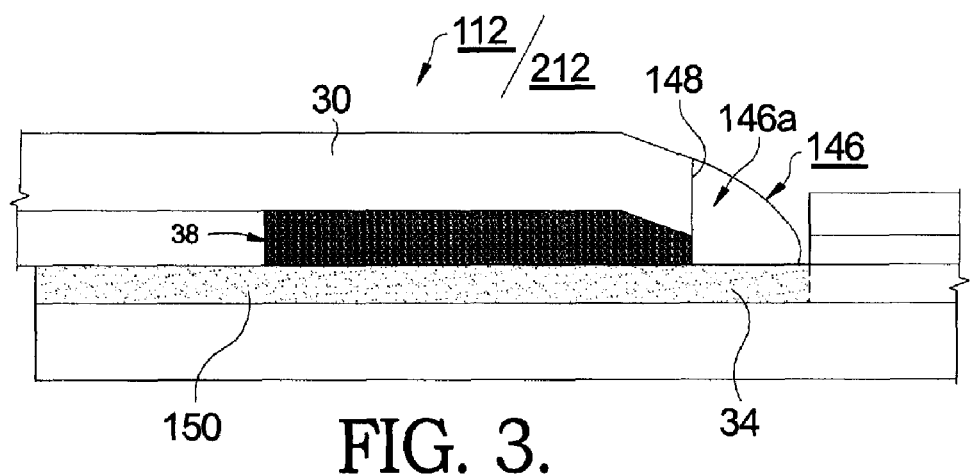
FIG. 3 is a cross-sectional view of a portion similar to the portion shown in FIG. 2, showing a first embodiment of an inhibitor in accordance with the present invention.
Figure 4:
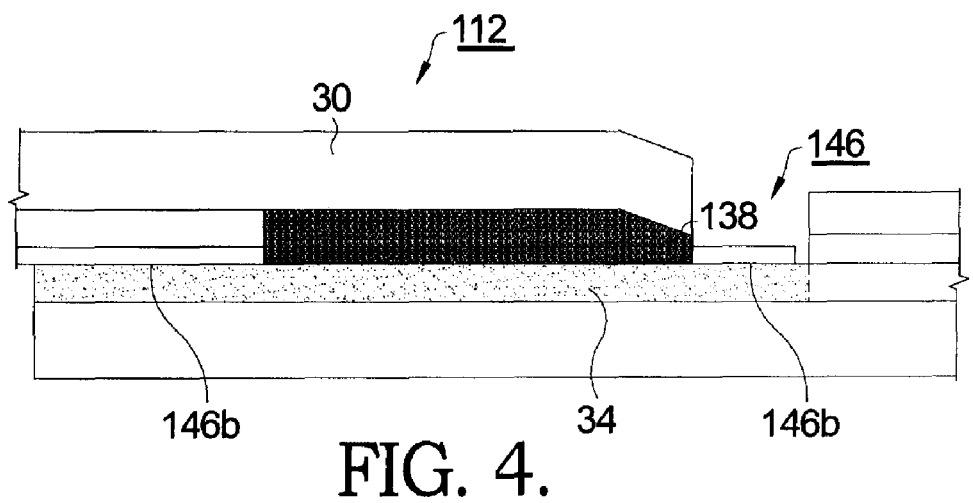
FIG. 4 is a cross-sectional view of a portion similar to the portion shown in FIG. 3, showing a second embodiment of an inhibitor in accordance with the present invention.

Referring now to FIGS. 3 and 4, in a first embodiment 112 of a migration inhibitor in accordance with the present invention, a mechanical barrier 146 is printed or dispensed as a ceramic or metallic layer around the braze to maintain the braze form. Barrier 146 may be applied as a pre-process or post process of the brazing operation to prevent mechanically-driven migration of braze. Barrier 146 may comprise, for example, a glass bead 146a deposited adjacent the inner edge 148 of frame 30 and optionally in contact therewith. A currently preferred material for glass bead 146a is G18 glass. Alternatively, barrier 146 may comprise, for example, zirconia or ceria 146b.

Referring to FIG. 3, alternatively, in a second embodiment 212 of a migration inhibitor in accordance with the present invention, an electrically insulating feature 150 is provided in the electrolyte and/or interlayer over the electrolyte layer in the seal margins thereof to prevent migration driven by electrical potential. Preferably, the electrolyte and/or interlayer are impregnated with an insulating dopant such as magnesium aluminate, alumina, silica, or a glass ceramic.

In a third embodiment of a migration inhibitor in accordance with the present invention, the formula of Ag/Cu braze 38 is modified to include a third alloying metal. For example, the above referenced paper by Kim Vu shows that up to 30% Pd is beneficial in reducing Ag migration in Ag/Pd alloys. In the present invention, it is found that about 15% Pd in an Ag/Cu braze 138 (FIG. 3) is beneficial in inhibiting migration in an SOFC stack.

Note that the above-described embodiments of a migration inhibitor are not mutually exclusive and may be used either singly or in any combination within the scope of the present invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A solid oxide fuel cell comprising:
   a support anode;
   an electrolyte layer having an active area formed onto said support anode;
   a cathode layer formed on said active area of electrolyte layer;
   a support frame attached to said electrolyte layer, wherein said support frame includes an enclosure lip surrounding said active area of electrolyte layer and defining a gap between said cathode layer and said support frame; and
   a silver-containing brazed alloy joining said support frame to said electrolyte layer, wherein said silver-containing brazed alloy terminates at said enclosure lip of support frame; and
   an inhibitor for inhibiting migration of said silver-containing braze alloy along said electrolyte layer, said inhibitor comprising singly or alternatively in combination,
   a) a mechanical barrier disposed onto an element of said solid oxide fuel cell around said braze alloy to mechanically inhibit said migration;
   b) an electrically insulating feature provided in the seal margins of said element to inhibit migration of said braze alloy driven by electrical potential; and
   c) addition of a metal to said braze alloy.

2. A solid oxide fuel cell in accordance with claim 1 wherein material forming said mechanical barrier is selected from the group consisting of a glass ceramic, zirconia, ceria, and combinations thereof.

3. A solid oxide fuel cell in accordance with claim 2 wherein said glass ceramic is from a family of barium aluminum silicates.

4. A solid oxide fuel cell in accordance with claim 3 wherein said glass ceramic from the family of Barium Aluminum silicates is G18.

5. A solid oxide fuel cell in accordance with claim 1 wherein a material included in said electrically insulating feature is selected from the group consisting of magnesium aluminate, alumina, silica, or a glass ceramic.

6. A solid oxide fuel cell in accordance with claim 5 wherein said material forming said electrically insulating feature is a dopant.

7. A solid oxide fuel cell in accordance with claim 6 wherein said element is impregnated with said dopant.

8. A solid oxide fuel cell in accordance with claim 1 wherein said element is an electrolyte layer.

9. A solid oxide fuel cell in accordance with claim 1 wherein said metal added to said braze alloy is palladium.

10. A solid oxide fuel cell in accordance with claim 9 wherein said braze alloy comprises silver and copper, and wherein said palladium is added in an amount of about 15%.

11. A solid oxide fuel cell comprising:
    a support anode;
    an electrolyte layer having an active area formed onto said support anode;
    a cathode layer formed on said active area of electrolyte layer;
    a support frame attached to said electrolyte layer, wherein said support frame includes an enclosure lip surrounding said active area of electrolyte layer and defining a gap between said cathode layer and said support frame; and
    a brazed alloy joining said support frame to said electrolyte layer, wherein said brazed alloy terminates at said enclosure lip of support frame; and an inhibitor for inhibiting migration of said braze alloy, said inhibitor comprising singly or alternatively in combination, a) a mechanical barrier disposed onto an element of said solid oxide fuel cell around said braze alloy to mechanically inhibit said migration;

b) an electrically insulating feature provided in the seal margins of said element to inhibit migration of said braze alloy driven by electrical potential; and c) addition of a metal to said braze alloy.

* * * * *